2,949,967
BLADE-TO-HUB CONNECTOR FOR THRUST PRODUCING ROTOR

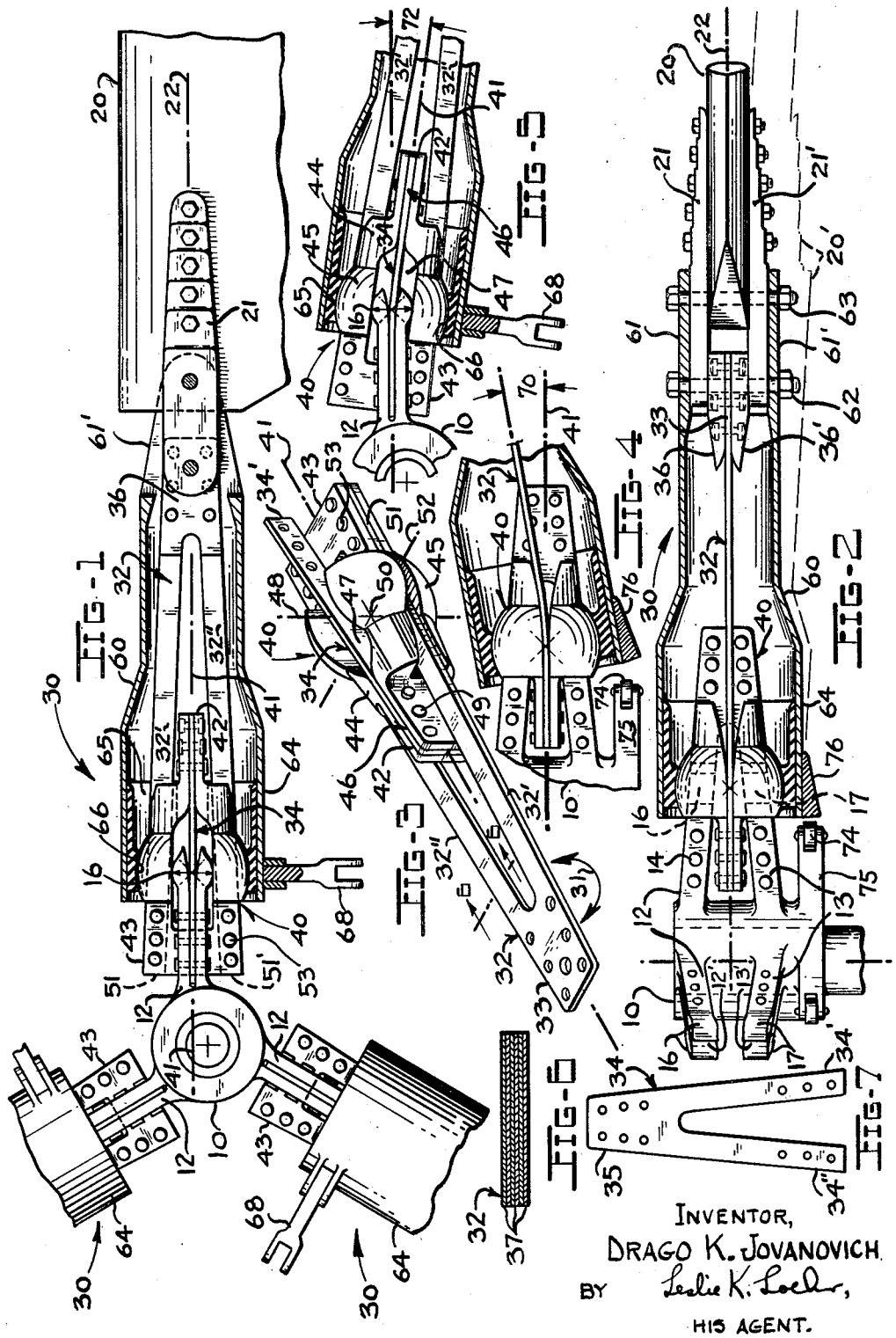

Drago K. Jovanovich, Santa Monica, Calif., assignor to Hughes Tool Company, Aircraft Division, Houston, Tex., a corporation of Delaware Filed May 25, 1959, Ser. No. 815,687

15 Claims. (Cl. 170—160.53)

This invention relates to aerodynamic thrust-producing rotors of the articulating type for rotary winged aircraft and in particular, to the devices employed for interconnecting the wings or rotor blades with the rotor hub so as to achieve articulation such that three-way movement of each blade relative to the hub is provided.

A fully articulated rotor of this character involves a structure wherein one end of each blade is connected to a rotatable hub for constrained movement in a circular path around the rotor axis and such that, at the same time, each blade is permitted to move relative to the hub in three different directions; namely (1) a rotary movement about the spanwise blade axis for effecting changes in the pitch of the blade as it travels in the circular path; (2) a swinging movement across the circular path to provide for a flapping action of the blade as it revolves with the hub around the rotor axis; and (3) another or second swinging movement in the plane of the circular path for effecting changes in the angular velocity of the blade relative to the driving hub while the blade travels the circular path.

Although the three different movements are of small magnitude, it is desirable that each movement be effected independently of the others; hence, it is common practice to provide blade-to-hub connections employing antifriction bearings mechanically arranged to constitute three functionally independent axes. Because of the small magnitudes of the three different movements and the relative large magnitudes of the centrifugal forces resulting from operation of the thrust-producing rotor, high stresses are concentrated in localized areas of the antifriction bearings; therefore, frequent inspection and lubrication are required as precautionary measures against failure of these bearings during operation of an aircraft equipped therewith.

The present invention contemplates a fully articulating blade-to-hub connection for an aerodynamic-thrust-producing rotor of the type employed on helicopters, wherein the necessities for any lubrication or for frequent inspections are eliminated. Accordingly, it is a principal object of the invention to provide a helicopter rotor with novel and mechanically efficient means interconnecting the rotor hub and rotor blades such that required movements of the blades relative to the hub are effected without pin-and-bearing structures. To accomplish this objective the invention further contemplates blade-to-hub connectors employing strap-like retention elements having sufficient strength to fully withstand all the forces involved in the thrust-producing operation of the rotor and adequate flexibility to accommodate the three different movements required of the blades relative to the rotor hub.

It is another object of the invention to provide blade-to-hub connectors of the above character wherein the actual connections to the hub and to the blades are effected with relatively thin strap-like elements of metal or other suitable material connected in coextensive intersecting planes by transition members clampingly associated with end portions of the strap-like elements.

It is another object to provide such blade-to-hub connectors in which each transition member is associated with the hub and the root end of the blade so that one of the strap-like elements is effective to permit rotary movement of the blade about its spanwise axis.

It is also an object to provide blade-to-hub connectors of the above type in which the relatively thin strap-like elements are of laminated construction to provide optimum flexibility with maximum strength.

These and other objects and advantages will become more apparent from the following description considered in connection with the accompanying drawings; it being expressly understood, however, that the drawings are for the purpose of illustration and description only, and are not intended as a definition of the limits of the invention.

In the drawing:

Fig. 1 is a fragmentary plan view, partly in section, of a thrust-producing rotor embodying this invention;

Fig. 2 is a fragmentary elevational view, partly in section, of the rotor shown in Fig. 1;

Fig. 3 is a perspective view showing the interconnection of the strap-like hinging elements;

Fig. 4 is a fragmentary elevational view showing a portion of the structure illustrated in Fig. 2;

Fig. 5 is a fragmentary plan view showing a portion of the structure illustrated in Fig. 1;

Fig. 6 is a cross sectional view taken on line 6—6 of Fig. 5; and

Fig. 7 is a plan view of one of the strap-like hinging elements.

The thrust-producing rotor fragmentarily shown in Figs. 1 and 2, includes a rotor hub 10 having a plurality of radially extending arms 12 and 13 arranged in pairs equally spaced around the hub circumference, a plurality of blades preferably contoured in a conventional manner for optimum aerodynamic thrust-producing ability, one of which blades is shown in part and is identified by reference numeral 20, and a plurality of connectors interconnecting the blades and the pairs of arms such that the blades are supported by the hub for rotation thereby in a circular path around the hub axis and such that the blades are permitted constrained movement in three different directions relative to the hub and to the path of rotation, one of which connectors is clearly illustrated and is identified by reference numeral 30.

Connector 30 is, in effect, an assembly comprising a generally cylindrical sleeve 60 surrounding relatively thin strap-like elements 32 and 34 interconnected in coextensive intersecting planes by an elongated transition member 40 such that tensional forces applied to the strap-like elements are applied to the transition member as compressive forces. In this connection, it is noted that the strap-like elements 32 and 34 are not only bifurcated to permit their coextensive relationship, but the branches or legs 32'—32" of element 32 are made much longer than legs 34'—34" of element 34 to facilitate lengthwise twisting of element 32, as indicated by arrow 31 in Fig. 3, to provide for rotational movement of blade 20 about its spanwise axis 22.

As seen in Fig. 3, transition member 40 is provided with a longitudinal axis 41 and is constructed to include axially flattened end portions 42 and 43 projecting from axially adjacent cylindrical and spherical shaped portions 44 and 45 such that all portions are not only axially aligned, but the flattened end portions 42 and 43 are symmetrical with respect to axis 41 and are disposed in respective planes oriented at right angles relative to each other around said axis. To effect the coextensive relationship in intersecting planes between the strap-like elements 32 and 34, previously mentioned, transition member 40 is also provided with slots for receiving these elements so as to securely hold the ends of legs 32'—32" and end 35 (see Fig. 7) of element 34 such that tensional forces applied to the strap-like elements applies the compressive forces to member 40.

Looking at Figs. 1, 2 and 3, it can be seen that flattened end portion 42 of transition member 40 is constructed with a slot 46 extending therethrough and into cylindrical portion 44 where it joins a wider slot 47 extending through spherical portion 45, which slots are aligned with axis 41 and a vertical axis 48 passing through the geometrical center 50 of the spherical surface on portion 45 at right angles to axis 41. It is also to be seen that end 35 of strap-like element 34 is clamped between the sides of slot 46 with the aid of rivets 49 such that the end portion 42 normally supports element 34 in a vertical plane passing through axes 41 and 48 of transition member 40. To be further noted, is the fact that flattened end portion 43 of the transition member 40 is provided with coplanar slots 51 and 51' which slots extent through the spherical and cylindrical surfaces of portions 45 and 44 and are aligned with axis 41 and a lateral axis 52 which passes through geometrical center 50 at right angles to axes 41 and 48. It is also to be noted, that the distal ends of legs 32'—32" of the strap-like element 32 are clamped between the opposite sides of slots 51 and 51' with the aid of rivets 53 such that end portion 43 normally supports the strap-like element 32 in a plane passing through axes 41 and 52 at right angles to the plane in which strap-like element 34 is normally supported.

The mechanical connection between hub 10 and connector 30 is effected through the strap-like element 34 and arms 12 and 13 which arms, in addition to being paired with each other, extend radially from hub 10 in common plane parallel with the hub axis and are provided with coplanar slots 12'—13' extending through and lengthwise thereof to receive the distal end portions of legs 34'—34" such that these leg portions are clamped between the sides of the slots with the aid of rivets 14 whereby element 34 is securely connected to the hub in a plane parallel with the axis of hub 10. Another structural feature of arms 12—13 resides in the fact that the distal ends of these arms are not only enlarged transversely of the coplanar slots such as to present cylindrical surfaces 16—17 in sliding engagement with the sides of slot 47 in transition member 40, but they are also proportioned in length with respect to each other such that the cylindrical surfaces 16 and 17 have a common axis in parallel relationship to the axis of hub 10 and such that this common axis is approximately coincident with vertical axis 48 of the transition member.

Turning now to the connection between blade 20 and connector 30, it is seen in Figs. 1 and 2 that blade 20 is provided with attachment fittings 21—21' bolted to opposite sides of the inboard end of the blade, which fittings engage blocks 36—36' riveted one on each side of end 33 of strap-like element 32, and that the outboard end of sleeve 60 is provided with parallel lugs 61—61' which engage the outer surfaces of fittings 21—21' such that bolts 62 and 63 extending through lugs 61—61', fittings 21—21', and blocks 36—36' rigidly connect the sleeve and clampingly connect strap-like element 32 to the end of the blade as shown. Sleeve 60 constructed to extend inwardly toward hub 10 from blade 20 such that its inboard end 64 surrounds spherical portion 45 of transition member 40 is provided with a bearing element 65 having a spherical inner surface 66 in sliding contact with the spherical surface of portion 45 and a cylindrical outer surface in sliding contact with the bore in the inboard sleeve end 64. These bearing surfaces are made concentric with each other about the axis of sleeve 60 and cooperate with the structures involved in the connection of blade 20 to connector 30 such that blade axis 22 and the sleeve axis are aligned with the geometrical center 50 of the spherical portion 45 at all times.

Before describing the manner in which connector 30 operates to permit the previously mentioned three different movements of blade 20 relative to hub 10 and the circular path traveled by the blade around the hub axis, it is pointed out that in a thrust-producing rotor of the character embodied in this disclosure, each rotor blade not only produces a thrust, but it also produces a centrifugal force having a magnitude which in conventional design practice, generally approximates ten times the magnitude of the thrust, depending upon blade construction and the angular velocity of the blade around the axis of the hub. Therefore, it is evident that, when such a rotor is revolving at thrust-producing speed, the centrifugal force and the thrust produced by each blade are transmitted to the hub by the blade-to-hub connecting means. Since, in this invention, connector 30 constitutes such a blade-to-hub connecting means, it follows that the centrifugal force produced by blade 20 is transmitted to hub 10 as a tensional force applied to strap-like elements 32—34 and hub arms 12—13, and as a compressive force applied to transition member 40; while the thrust produced by blade 20 is transmitted to the hub arms and the hub by sleeve 60, bearing element 65, transition member 40 and strap-like element 34.

It was previously explained that strap-like elements 32 and 34 are supported in coextensive intersecting planes such that element 32 is normally disposed in a plane at right angles to the axis of hub 10 and element 34 is normally disposed in a plane parallel to said hub axis. The advantages of this construction reside in the fact that strap-like elements such as elements 32—34, bend with comparative ease in the flatwise direction and will when bending, simulate the hinging action of a pin-type hinge. Thus, connector 30 by employing strap-like elements 32—34, possess the functional qualifications of a pin-type universal joint. However, it is noted that in a pin-type joint or hinge, the hinging or swinging movement is around the axis of the pin, whereas, in a strap-type hinge the movement is around the effective center of the bend curvature of the strap-like element. Hence, for defining the bend curvatures of strap-like elements 32 and 34 in regions along their respective legs 32'—32" and 34'—34", the opposing sides of slots 51—51' in transition member 40 and the sides of slots 12'—13' in hub arms 12—13 are curved outwardly from the respective planes of the slots at the outboard end of these slots to provide curved surfaces for guiding the bending of elements 32—34 from their normal coextensive intersecting planes.

The bending involved in the hinging action of strap-like elements 32 and 34 results from forces applied to the outboard ends thereof, that is to ends 33 and 35. For instance, the bending of element 32 in the flatwise direction results from forces applied to blade 20 in a direction substantially parallel to the axis of hub 10, which forces are applied to end 33 in the same direction, because of its clamped condition between blocks 36—36', fittings 21—21' and lugs 61—61'. Moreover, bending of element 32 around curved surfaces at the outboard ends of slots 51—51' is assured because of the rigid connection between blade 20 and sleeve 60, and the sliding engagements afforded by bearing element 65 with sleeve 60 and transition member 40. The bending and hinging action of element 32 can be seen by inspection of Fig. 4 where reference numeral 70 indicates an angular displacement of blade 20 relative to hub arms 12—13 and transition member 40 about axis 52 of spherical portion 45, which angular displacement is effective to permit the flapping motion of blade 20 across the circular path traveled by the blade during rotation of the rotor at thrust-producing speeds.

Earlier in the description it was indicated that the legs of strap-like element 32 are made to permit rotational movement of blade 20 about its spanwise axis 22. The construction involved consists of making legs 32'—32" of sufficient length such that end 33 when clamped as shown in Figs. 1 and 2, can be rotated relative to transition member 40, as suggested by arrow 31 in Fig. 3, and with comparative ease even though tensional and/or bending forces are present in legs 32'—32" as a result of rotor rotation at thrust-producing speeds. Such rotation of blade 20 about its spanwise axis is effected by a collective and cyclic pitch control mechanism of conventional design (not shown) connected to an arm 68 securely attached to the inboard end 64 or sleeve 60. Because of the concentric relationship of the inboard sleeve end 64 with the spherical portion 45 of transition element 40, rotation of sleeve 60 by arm 68 is effected around the geometrical center 50 of said spherical portion; therefore, rotation of the blade about its spanwise axis can take place under a hinging action of either or both of the strap-like elements 32 and 34.

In connection with the bending of strap-like element 34, it is important to note the sliding engagement between the cylindrical surfaces 16—17 on the distal ends of hub arms 12—13 and the sides of slot 47 of transition member 40 because this arrangement guides the movement of said transition member such that tensional forces applied to legs 32'—32" of strap-like element 32 are applied to said member 40 and to end 35 of strap-like element 34 so as to bend legs 34'—34" of said element around curved surfaces at the outboard ends of slots 12'—13' in hub arms 12—13 and swing member 40 around the common axis of the cylindrical surfaces 16—17 on the distal ends of said hub arms 12—13, which distal ends and the cylindrical surfaces thereon also operate to preclude any tendency of transition member 40 to rotate about its own longitudinal axis 41. Thus, the sliding engagement between the cylindrical surfaces at the distal ends of the hub arms and the sides of slot 47 precludes application of forces by member 40 to strap-like element 34 which would tend to twist element 34 longitudinally.

The guided movement of transition member 40 by the distal ends of hub arms 12—13, and the hinging action of element 34 can be seen by inspection of Fig. 5, where reference numeral 72 indicates an angular displacement of blade 20 and member 40 relative to the hub arms about the common axis of cylindrical surfaces 16—17 at the ends of said arms, which angular displacement is effective for permitting lag and lead motion of blade 20 in the circular path traveled by the blade during rotation of the rotor at thrust-producing speeds.

It should also be noted that, when the rotor is revolving at thrust producing speed, the centrifugal force produced by blade 20 is of a magnitude such that tensional forces present in the legs 32'—32" and 34'—34" are sufficient to preclude any tendency for edgewise bending of said legs without materially affecting the ease of bending these legs in the flatwise direction.

A droop-stop comprising a roller 74 supported by an arm 75 extending radially from hub 10, and a shoe 76 fixed to the inboard end 64 of sleeve 60, is provided as shown in Figs. 2 and 4. Stops of this character are commonly employed in helicopters to prevent excessive droop of the rotor blades when the rotor is not revolving or is revolving slowly. As indicated in Fig. 2, when blade 20 droops to an angle where it occupies a position indicated by dashed lines 20', shoe 76 strikes roller 74 and prevents further downward movement of the blade. Under such conditions the weight of blade 20 not only bends strap-like element 32 in a direction opposite to that shown in Fig. 4, but it also produces tensional forces in legs 32'—32" and 34'—34" of their respective strap-like elements and compressive forces in transition member 40.

Although Fig. 6 is a cross sectional view of only one leg of the bifurcated strap-like element 32, it is presented to illustrate both strap-like elements 32 and 34 and to indicate that these elements are preferably constructed of laminations 37 having characteristics such as to provide legs 32'—32" and 34'—34" with optimum strength to withstand all forces resulting from rotor operation and with optimum flexibility to permit the three different movements of blade 20 relative to hub 10 and the circular path traveled by the blade as above described.

What is claimed as new is:

1. In an aerodynamic thrust-producing rotor having a rotor hub, an aerodynamic thrust-producing blade disposed in a generally radial position with respect to the hub, and hinging means interconnecting the blade and hub such that rotation of the hub causes the blade to travel in a circular path around the hub axis and such as to permit hinging movements of the blade relative to the hub in and across said circular path as the blade revolves with said hub, said hinging means comprising: first and second strap-like flexible elements respectively connected to the hub and to one end of the blade; and a transition member interconnecting the flexible elements in coextensive intersecting planes substantially normal to each other such that the blade is supported by the hub and such that the strap-like flexible elements are effective for permitting blade hinging movements in and across the circular path traveled by the blade when the latter revolves with the hub.

2. The hinging means according to claim 1 wherein one of the strap-like flexible elements comprises a plurality of relatively thin pieces of sheet material disposed in side-by-side relationship such as to provide said one element with a quality of easy-bending transversely of its strap-like structure.

3. In an aerodynamic thrust-producing rotor having a rotor hub, an aerodynamic thrust-producing blade disposed in a generally radial position relative to the hub, and means interconnecting the hub and blade for rotation of the blade in a circular path around the hub and such as to permit hinging movements of the blade relative to the hub in and across said circular path as the blade revolves with said hub, said means comprising: first and second strap-like flexible elements respectively connected to the hub and to one end of the blade; and a transition member interconnecting the strap-like flexible elements in coextensive intersecting planes such that the blade is drivenly supported, by the hub and such that the flexible qualities of said strap-like elements are effective for permitting blade hinging movements in and across the circular path of the blade as it revolves with the hub.

4. The interconnecting means defined in claim 3 wherein the first and second strap-like flexible elements are structures comprising a plurality of relatively thin pieces of sheet metal disposed side-by-side so as to provide said elements with easy bending qualities transversely thereof.

5. In an aerodynamic thrust-producing rotor having an axis of rotation, a hub rotatable about the axis, an aerodynamic thrust-producing blade disposed in a generally radial position with respect to the hub, and hinging means interconnecting the blade and hub such that rotation of the hub causes the blade to travel in a circular path around the rotor axis and such as to permit hinging movements of the blade relative to the hub in and across said circular path as the blade revolves with said hub, said hinging means comprising: a first strap-like flexible element; an arm radially extending from the hub connecting said first strap-like element in bendable relationship to said hub; a second strap-like flexible element having one end connected to the inner end of the radially disposed blade; and a transition member guidedly associated with the radially extending arm, interconnecting the first and second strap-like elements in coextensive and angularly intersecting planes such that the blade is supportedly connected to the hub by the first strap-like element, and such that said strap-like elements and transition member are respectively subjected to tensional and compressive forces by the supporting action of the hub, and such that the second strap-like element is connected to the transition member in bendable relationship with respect thereto; said bendably connected relationships between the hub and first strap-like member and between the transition member and the second strap-like element being effective for permitting the hinging movements of the blade in and across the circular path traveled by the blade around the rotor axis.

6. In an aerodynamic thrust-producing rotor having an axis of rotation, a hub rotatable about said axis, an aerodynamic thrust-producing blade disposed in a generally radial position with respect to the hub, and hinging means interconnecting the blade and hub such that rotation of the hub causes the blade to travel in a circular path around the rotor axis and such that hinging movements of the blade relative to the hub are permitted in and across said circular path as the blade revolves with said hub, said hinging means comprising: a pair of first strap-like flexible elements; a pair of rigid arms rigidly extending radially from the hub and clampingly engaging respective end portions of the first strap-like elements such that said first elements are radially supported by the hub in a common plane substantially parallel with the rotor axis, the clamping engagements being conditioned for curved bending of the first strap-like flexible elements relative to the rigid arms by divergently curved distal end portions of said arms, which curved end portions constitute means defining bend curvatures of said first strap-like elements; a pair of second strap-like flexible elements having ends connected to the inner end of the radially disposed blade; and a transition member positionally associated with the distal ends of the rigid arms and interconnecting the pairs of first and second strap-like elements in coextensive intersecting planes, said transition member being characterized by first and second clamping means respectively engaging distal end portions of the first and second strap-like elements such that the rotor blade is drivenly connected to the rotor hub by the rigid arms for rotation in a circular path around the rotor axis; said transition member being further characterized by fact that the connections clamping the second strap-like elements to said member are conditioned for curved bending of the second elements relative to the transition member by divergently curved portions of said member associated with the second clamping means, which curved portions constitute means defining the bend curvatures of the second strap-like elements; and said curved-bending relationships of the first and the second strap-like flexible elements to the rigid arms and to the transition member being effective to permit hinging movements of the blade in and across the circular path of blade rotation around the rotor axis.

7. In an aerodynamic thrust-producing rotor having a hub, a plurality of aerodynamic blades, and means coupling the hub and the blades in force-transmitting relationship, said coupling means comprising: first hinging means connected to the hub; second hinging means connected to ends of the blades; and transition members interconnecting said first and second hinging means such that each blade is drivenly connected to the rotor hub for rotation thereby in a circular path around the rotor axis and for hinging movements of the blade relative to the hub in and across said circular path; said first hinging means including strap-like flexible elements, and arms rigidly extending radially from the hub and clampingly engaging respective end portions of the strap-like elements such that said elements are radially supported by the hub; and said arms having divergently curved end portions of a character such that the clamping engagements between the rigid arms and flexible elements are conditioned for curved bending of said flexible elements to provide for the hinging movements of the blade relative to the hub in the circular path around the rotor axis.

8. In an aerodynamic thrust-producing rotor having a hub, a plurality of aerodynamic blades, and means coupling the hub and the blades in force-transmitting relationship, said coupling means comprising: first hinging means supportedly connected to the hub; second hinging means connected to ends of the blades; and transition members interconnecting said first and second hinging means such that each blade is drivenly connected to the rotor hub for rotation thereby in a circular path around the rotor axis and for hinging movements of the blade relative to the hub in and across said circular path; each of said second hinging means including strap-like flexible elements connected to the root ends of the blades; and each of said second transition members being characterized by clamping means engaging ends of the strap-like flexible elements and by divergently curved portions of said clamping means such that the clamping engagements between the transition member and the flexible elements are conditioned for curved bending of said flexible elements relative to said transition members to provide for the hinging movements of the blade relative to the hub across the circular path around the rotor axis.

9. In an aerodynamic thrust-producing rotor having a hub, an aerodynamic thrust-producing blade, and means coupling the hub and blade in force-transmitting relationship, said coupling means comprising: first hinging means supportedly connected to the hub; second hinging means connected to one end of the blade; and a transition member interconnecting said first and second hinging means such that the blade is drivenly connected to the rotor hub for blade rotation in a circular path around the rotor axis, and for hinging movements of the blade relative to the hub in and across the circular path, and for rotary movement of the blade about its own spanwise axis; said second means including strap-like flexible elements connected to the root end of the rotor blade and a hollow generally cylindrical member surrounding the strap-like elements having one end connected to the root end of the blade and the other end rotatively associated with the transition member; and said transition member being characterized by clamping means engaging ends of the strap-like flexible elements and by divergently curved portions of said clamping means such that the clamping engagements between the strap-like elements and the transition member are conditioned for curved bending of said strap-like elements relative to said transition member to provide for the hinging movements of the blade across the circular path.

10. The coupling means defined in claim 9 in which the transition member is provided with a load-bearing surface in rotative load-supporting engagement with said other end of the hollow cylindrical member such that thrust produced by the blade is transmitted to the rotor hub.

11. The coupling means defined in claim 10 in which the strap-like flexible elements and the hollow generally cylindrical member of the second hinging means cooperate with the transition member to position the blade radially of the hub such that movement of the blade about its spanwise axis is effected by rotary movement of said cylindrical member around the load-bearing surface on said transition member.

12. The coupling means defined in claim 11 in which the first hinging means comprises strap-like flexible elements, and arms rigidly extending radially from the rotor hub and clampingly engaging respective end portions of the strap-like elements such that said elements are radially supported by the hub, said arms having divergently curved end portions of a character such that the clamping engagements between the rigid arms and flexible elements are conditioned for curved bending of said flexible elements to provide for the hinging movements of the blade relative to the hub in the circular path traveled by the blade around the rotor axis.

13. The coupling means defined in claim 12 in which the strap-like flexible elements of the first and second means are laminated structures comprising thin-gauge pieces of sheet material.

14. The coupling means defined in claim 13 in which the first and second hinging means are interconnected by the transition member such that the laminated structures comprising said hinging means are disposed in coextensive intersecting planes.

15. In an aerodynamic thrust-producing rotor having a hub, a plurality of aerodynamic blades, and means coupling the hub and the blades in force-transmitting relationship, said coupling means comprising: first hinging means connected to the hub; second hinging means connected to ends of the blades; and transition members interconnecting said first and second hinging means such that each blade is drivenly connected to the rotor hub for rotation thereby in a common circular path around the rotor axis and for hinging movements of said each blade relative to the hub in and across said circular path; said first and second hinging means comprising strap-like elements clampingly supported by the hub and said transition member respectively, in coextensive intersecting planes such that said elements are arcuately bendable in the flatwise direction of their strap-like structure.

References Cited in the file of this patent

UNITED STATES PATENTS

| | | |
|---|---|---|
| 2,217,106 | Focke | Oct. 8, 1940 |
| 2,612,963 | Dorand | Oct. 7, 1952 |

FOREIGN PATENTS

| | | |
|---|---|---|
| 692,503 | France | Aug. 4, 1930 |
| 935,352 | France | Feb. 2, 1948 |